Nov. 26, 1968  F. O. WISMAN  3,413,494

MAGNETIC AMPLIFIER CONTROL SYSTEM

Filed June 28, 1966  2 Sheets-Sheet 1

INVENTOR.
FRANKLIN O. WISMAN
BY
M A Hobbs

ATTORNEY

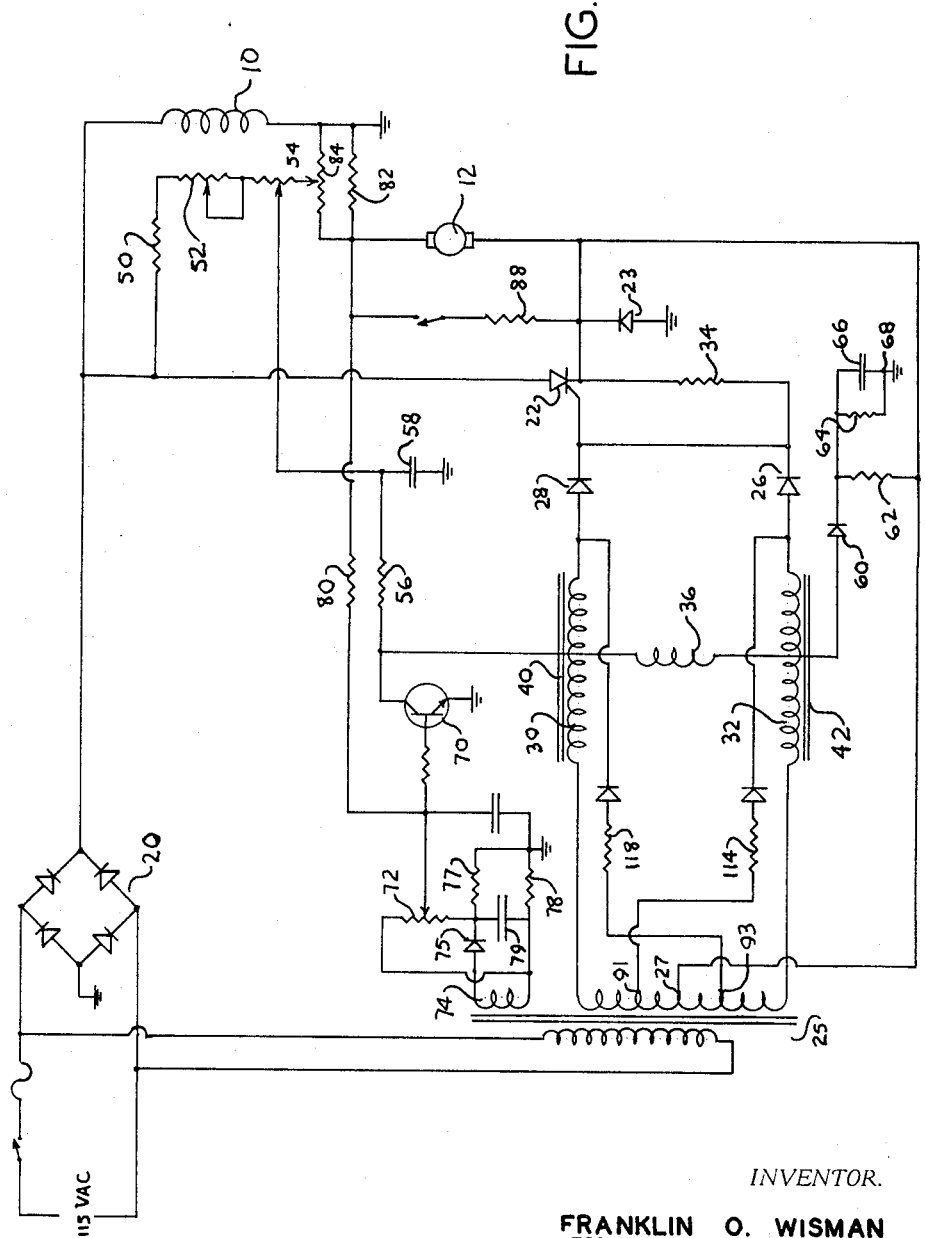

United States Patent Office 3,413,494
Patented Nov. 26, 1968

3,413,494
MAGNETIC AMPLIFIER CONTROL SYSTEM
Franklin O. Wisman, South Bend, Ind., assignor to The Reliance Electric and Engineering Company, a corporation of Ohio
Filed June 28, 1966, Ser. No. 561,270
12 Claims. (Cl. 307—252)

ABSTRACT OF THE DISCLOSURE

A motor control system having a transformer, a magnetic amplifier with two load windings, a silicon controlled rectifier, and leads connected to the transformer and to the leads from the load windings and having in series a resistor and a diode, which reset the flux in one load winding while the flux to the other load winding is increasing in response to the current from the transformer.

---

In the application of magnetic amplifier control systems, current flowing through a gate or load winding to the load tends to leave its core in a condition of saturation at the conclusion of its conduction period. It is necessary to reset the flux condition back to an unsaturated condition to ready the amplifier for a controlled response on the next forward conduction period of that core. In the prior art, this has been accomplished by a distinct bias or reset winding. Further, closed circuit damping windings have commonly been applied to stabilize operation by slowing the transient response. However, these prior art methods increase the cost, bulk and weight of the control system. It is therefore an important object of this invention to reduce cost, weight and bulk compared to the prior devices, and to improve reliability by eliminating the need for bias and damping windings, while accomplishing their functions, all by means of suitable circuitry associated with the load windings. In consequence, the windings needed for full wave operation are reduced in number from five to three.

Another object of the invention is to provide a relatively simple circuit of the aforesaid type in a magnetic amplifier of a motor control system, which can readily be incorporated in the conventional magnetic amplifier without changing the characteristics of the amplifier for normal running operation and control of the motor and which does not interfere wtih the starting of the motor under normal conditions following motor shutdown under no load or light load conditions.

Additional objects and advantages of the invention will become apparent from the following description and accompanying drawings, wherein:

FIGURE 3 is a schematic diagram of an electronic motor control device embodying a modification of the present invention.

Figure 2:
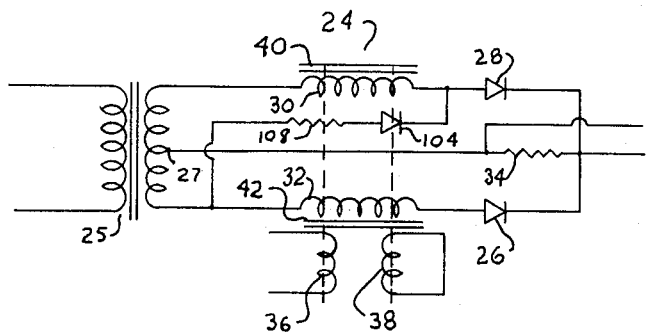
FIGURE 2 is a schematic diagram of a simplified version of the invention.

Referring more specifically to the drawings, the motor to be controlled consists of two parts, the field winding 10 and the armature 12. The direct current necessary to operate the motor is derived from rectifier bridge 20. Field winding 10 is connected directly between bridge 20 and ground and is thus always operated at the same potential. Armature 12, however, receives its operating voltage through silicon controlled rectifier 22, part of the voltage regulator circuit composed of silicon controlled rectifier 22 and diode 23, and the voltage and current flowing into armature 12 are regulated by said silicon controlled rectifier (hereinafter referred to as SCR) 22. The SCR, in turn, is controlled by a magnetic amplifier 24, through diodes 26 and 28, load current windings 30 and 32 of the magnetic amplifier acting upon resistor 34 as their common load, with the gate of SCR 22 sensing variations in voltage across said load. Power for the operation of the magnetic amplifier 24 is taken from transformer 25, the center tap 27 of which is connected to the side of the load resistor 34 opposite rectifiers 26 and 28 in a standard configuration requiring no further explanation. Control winding 36 of magnetic amplifier 24, by varying the amount of saturation of the cores of the magnetic amplifier, regulates the impedance of load windings 30 and 32, thus regulating the current and voltage flowing through the load windings, and the current flowing to the resistor 34 and SCR 22. The method of control for winding 36 will be described in detail hereinafter. Damper winding 38 serves to smooth out the response of the magnetic amplifier, and its operation will be described later in this application.

Control winding 36 is the primary speed control. An increase in the current through this winding results in an increase in the saturation of the cores 40 and 42 of magnetic amplifier 24, causing a decrease in the impedance of load windings 30 and 32, and a subsequent increase in the speed of the motor. The voltage to winding 36 is derived from rectifier bridge circuit 20, through voltage divider resistor 50, potentiometers 52 and 54, and fixed resistor 56. Storage capacitor 58 serves to produce a progressive timed starting ramp, and on energization, it will be charged from bridge 20 through resistances 52 and 54 in the well-known exponential manner. It also serves to reduce ripple components of current in control winding 36. After passing through control winding 36, the current passes through blocking diode 60 and the voltage divider circuit, comprising resistors 62 and 64 and storage capacitor 66 and thence to ground 68. The current through control winding 36, and therefore the speed of the motor, are variably controlled by rheostat 52, which limits the maximum speed of the motor, and by potentiometer 54, which varies the speed of the motor to satisfy requirements.

By providing a secondary ground return for the positive EMF coming off resistor 56, the circuit comprising transistor 70 and its associated biasing circuitry, described in more detail hereinafter, acts as a current limiter, in an effect countering the direct action of the speed control 54 in accordance with the bias on the base of transistor 70. The effect of this circuit is to by-pass current applied to winding 36 when the motor armature current exceeds a pre-established value. This is accomplished by applying a current through resistance 80 to the base of transistor 70. This current is poled in a direction to induce conduction of transistor 70, and the current being derived from resistor combination 82 and 84 carrying motor armature current is proportional thereto. The base of transistor 70 is also being supplied with a determinate value of reference current through potentiometer 72, dividers 77 and 78 from capacitor 79, diode 75 and transformer winding 74. This reference current is poled to hold the transistor non-conducting, opposing the effect of the current being supplied through resistor 80. Transistor conduction occurs when the current through 80, proportional to armature current, overcomes the oppositely poled reference. Transistor conduction has the effect of diverting or by-passing the current through control winding 36 which would otherwise produce greater armature currents.

Potentiometer 84 provides an adjustable means for keeping the motor speed constant under varying loads by sensing changes in voltage across current limiting resistor 82 and IR compensation potentiometer 84. As the load on the motor increases, the current it draws tends to increase, and this, in turn, causes the voltage appearing at point A to increase as $$E=IR$$

where E is the voltage drop across the resistor;
I is the current being drawn through the resistor; and R is the resistance, in this case, the resistance comprising the parallel resistance of current limiting resistor 82 and IR compensation potentiometer 84, which, being at any given instant of a constant resistance, may be treated as a constant K. By substituting in the formula, $E=IK$ is obtained, and the voltage drop across the resistors 82 and 84 is directly proportional to the current drawn through them. Thus, as the load on the motor increases, with its subsequent increase in current drawn, the voltage developed across resistor 82 increases proportionately. Potentiometer 84 allows an adjustable fraction of that voltage to be inserted in series with speed selector potentiometer 54, in effect adjusting the speed input signal upward, and increasing the voltage applied to control winding 36. This has the effect of increasing the time of current conduction through load current windings 30 and 32 of magnetic amplifier 24, and causing SCR 22 to pass more current to the armature to satisfy the demands of the increased load. Conversely, a decreased load, with the subsequent tendency of the motor to increase its speed, is counteracted by a decrease in the current through the motor armature.

The IR compensation potentiometer 84 compensates for error introduced by the voltage drop across the internal resistance of the armature 12. Its effect is reflected back on speed control potentiometer 54, resulting in correction for the heretofore mentioned internal resistance of said armature. Resistor 88 is a dynamic braking resistor which is operative in the circuit only when power has been removed from the armature and the motor is slowing down. It serves as a circuit for draining off the current produced by the armature as it slows down, and allows for quicker and smoother braking of the motor.

The foregoing has been primarily concerned with the system without reference in detail to the instantaneous operation of the magnetic amplifier. When load winding 30 is instantaneously positive and load winding 32 is negative with respect to center tap 27 of transformer 25, due to the effect of the polarity of diodes 26 and 28, current flows through load winding 30 to load resistor 34, and no current flows through winding 32. When the alternating current cycle proceeds, and winding 32 becomes positive, it begins to conduct. In the present stage of the cycle, however, winding 30 is positive. As the potential of the charge applied to gate winding 30 increases, more flux is developed in the core 40 until it reaches saturation. Further potential application cannot be counterbalanced by growth of flux and the remainder of the potential cycle is delivered to resistance 34 and applied to the control electrode SCR 22, initiating its conduction. The cores are made in such a way that they retain the maximum saturation with no appreciable loss before the next cycle begins; hence, if the performance is to be controlled during the succeeding cycle, it is necessary to prepare the core by reducing this saturation flux remnant to a lower level during its nonconduction period. Previously, a separate bias winding, including associated circuitry, was used to reset the amplifier to the conditions determined by the control winding.

Figure 1:
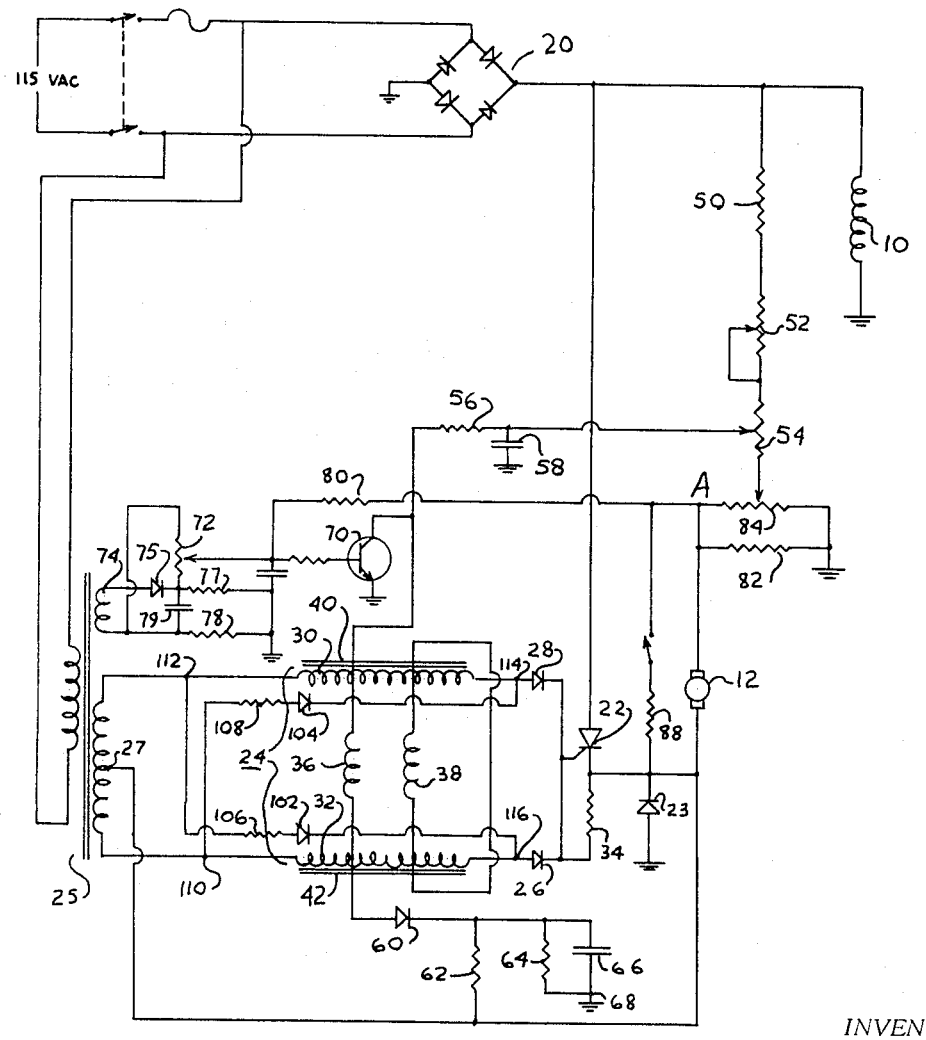
FIGURE 1 is a schematic diagram of an electronic motor control device embodying the present invention.

The present invention eliminates the bias winding replacing it with two series circuits, one comprising diode 102 and resistor 106 connected between points 112 and 116, and the other comprising diode 104 and resistor 108 connected between points 110 and 114, as shown in FIGURE 1. Assume that one-half of the cycle is now completed. Core 40 of load winding 30 is now saturated and core 42 of load winding 32 is becoming more saturated as more current flows through winding 32. Polarity of the circuit is such that needful reset current flows from the junction 110 of coil 32 and transformer 25 though resistor 108 and diode 104 through load winding 30 back to transformer 25. Since the current is now flowing in a direction opposite the flow which created the high flux density in core 40, the magnetic coercion which is produced by winding 30 is in the opposite direction to the magnetism retained by core 40, and this magnetic flux is consequently destroyed so that final flux density is determined primarily by control winding 36 of magnetic amplifier 24. As the polarity continues to change, the residual flux created by current flowing through the control windings is counteracted, and the SCR cell 22 will be fixed at a determinate time to establish a definite motor energization speed. Resistors 106 and 108 are so chosen that they permit satisfactory resetting of the cores while being sufficiently large that they do not adversely affect SCR 22.

FIGURE 2 shows a simplified version of the present invention. In this modified form, damper winding 38 acts to force reset of core 42, serving to equalize saturation of the two cores 40 and 42. Ordinarily, the two cores would be maintained at the undesirable saturated level; however, resistor 108 and diode 104 act in the manner heretofore described and maintain the saturation of core 40 at the proper level. By means of the equalizing effect and flux transport property of damper winding 38, both cores are then kept at the proper level of saturation.

Further simplification of magnetic amplifier control systems is made possible by the present invention. In the circuit of FIGURE 3, the damper winding is eliminated and the damper function is assumed by the gate windings. Overly abrupt changes in current applied to control winding 36 can cause overload to components in the control circuitry or jerky operation of the motor, causing possible damage to the motor and to equipment driven by the motor. Previously, a closed circuit damper winding was provided to effect smoother response to these abrupt changes. In prior art, damper windings are ordinarily short-circuited and act in the well known manner in the resistive and inductive circuits to smooth the transient response. An increase in the resistance associated with the circuit permits more rapid response, and a reduction in circuit resistance forces slower response. The resistance is ordinarily designed into the damper winding itself, although an external resistance may be used in some circumstances.

Referring to FIGURE 1, it is seen that the biasing circuitry comprising resistances 108, 106 and diodes 102 and 104, results in the imposition of a closed resistance inductive circuit, utilizing resistor 106 and diode 102 on one half of the cycle and resistor 108 and diode 104 on the other half of the alternating cycle. In the practical embodiment, resistances 108 and 106 would be in the general range of 40,000 ohms and would tend to produce relatively little damping. Normal damping would require a resistance in the general range of a few hundred ohms. In the embodiment shown in FIGURE 3, the damping function is obtained by feeding the bias resistors from intermediate taps on the transformer 25. In FIGURE 3, the bias resistors are numerals 114 and 118 corresponding respectively in function to 106 and 108 in FIGURE 1 and are connected to taps 91 and 93 which are so located that the resistances 114 and 118 are of the magnitude required for the desired damping action. Hence, the prior art circuitry embodying a separate reset winding and a separate damper winding has been eliminated in favor of the present concept in which the reset and damper functions are imposed upon and accomplished by the load windings 30 and 32. As mentioned hereinbefore, this results in reduction of the required number of magnetic amplifier windings from five in the prior art construction to three in the present instance, and results in economies of manufacture and improvement in reliability through reduction in the number of active elements.

While three embodiments of the circuitry have been described in detail herein, various changes and modifications may be made without departing from the scope of the invention.

I claim:
1. In a motor control: a system comprising a transformer, a magnetic amplifier having first and second load windings, electronic switching means, a lead connecting said transformer to said first load winding, a lead connecting said transformer to said second load winding, leads connecting said first and second load windings to said means, a circuit having a lead connecting the lead between said transformer and said first load winding with the lead from said second load winding to said means, a lead connecting the lead between said transformer and said second load winding with the lead from said first load winding to said means, and a resistor and a diode in series in each of the two leads of said circuitry, whereby the flux in one load winding is reset while the flux in the other load winding is increasing in response to the current from said transformer.

2. A motor control system as defined in claim 1, in which said electronic switching means is a silicon controlled rectifier.

3. A motor control system as defined in claim 1, in which a control winding is used to vary the current flow in the load winding.

4. A motor control system as defined in claim 2, in which a damper winding is used for minimizing spurious fluctuations in the current from the load windings.

5. A motor control system as defined in claim 2, in which a control winding is used to vary the current flow in the load windings.

6. A motor control system comprising a transformer, a magnetic amplifier having two load windings, electronic switching means, leads connecting said transformer to said load windings, leads connecting said load windings to said electronic switching means, a circuit having a lead connecting a lead between said transformer and one of said load windings with the lead from the other of said load windings to said means, and a resistor and a diode in series in said lead in said circuit.

7. A motor control system as defined in claim 6, in which said electronic switching means is a silicon controlled rectifier.

8. A motor control system as defined in claim 2, in which the resistors in the leads of said circuits are of a value sufficient to maintain the current in the respective leads to less than that required to trigger the silicon controlled rectifier, but sufficient to accomplish reset.

9. A motor control system as defined in claim 7, in which the resistors in the leads of said circuits are of a value sufficient to maintain the current in the respective leads to less than that required to trigger the silicon controlled rectifier, but sufficient to accomplish reset.

10. In a motor control: a system comprising a transformer having a secondary winding with two intermediate taps, a magnetic amplifier having first and second load windings, an electronic switching means, a lead connecting said transformer to said first load winding, a lead connecting said transformer to said second load winding, leads connecting said first and second load windings to said electronic switching means, a circuit having a lead connecting one of said transformer taps with the lead from said second load winding to said means, a lead connecting the other of said transformer taps with a lead from said first load winding to said means, and a resistor and a diode in series in each of the two leads of said circuit, whereby the value of said resistances and the location of said transformer taps are proportioned to produce a desired rate of response to abruptly applied control signals on the control winding of said magnetic amplifier.

11. A motor control system as defined in claim 10, in which the resistors in the leads of said circuits are of a value sufficient to maintain the current in the respective leads to less than that required to trigger the electronic switching means, but sufficient to accomplish reset.

12. In a motor control: a system comprising a transformer having a secondary winding with an intermediate tap, a magnetic amplifier having first and second load windings, an electronic switching means, a lead connecting said transformer to said first load winding, a lead connecting said transformer to said second load winding, leads connecting said first and second load windings to said electronic switching means, a circuit having a lead connecting said transformer tap with the lead from one of said load windings to said means, and a resistor and a diode in series in the lead of said circuit.

References Cited
UNITED STATES PATENTS

| | | | |
|---|---|---|---|
| 3,207,975 | 9/1965 | Pintell | 323—22 |
| 3,222,585 | 12/1965 | Lobb | 318—308 |
| 3,230,437 | 1/1966 | Cappello | 323—89 X |
| 3,258,654 | 6/1966 | Lutsch et al. | 323—89 X |

JOHN F. COUCH, *Primary Examiner.*

G. GOLDBERG, *Assistant Examiner.*